Patented Feb. 10, 1953

2,628,154

UNITED STATES PATENT OFFICE 2,628,154

METHOD OF RECOVERING CHROMATES AND VANADATES FROM AQUEOUS SOLUTION

Tom S. Perrin and Robert G. Banner, Painesville, Ohio, assignors to Diamond Alkali Company, Cleveland, Ohio, a corporation of Delaware No Drawing. Application April 28, 1950, Serial No. 158,918

6 Claims. (Cl. 23—19)

This invention relates to a method for the recovery of vanadates from substances containing lead vanadate, and more particularly relates to an improved method for recovering vanadates from precipitates containing lead vanadate and lead chromate.

It has been proposed to decompose substances containing lead vanadate with sulfuric acid to recover the vanadium values therefrom as a solution of soluble vanadic acid and to oxidize the solution thus obtained to precipitate the vanadium values from the solution as a salt of hexametavanadic acid. More specifically, in application Ser. No. 59,935, filed November 13, 1948, in the name of Tom S. Perrin and another (now Patent No. 2,583,591, dated January 29, 1952), a method is taught for the purification of chromate solutions, with respect to vanadate impurities therein, such as process liquors obtained in the commercial production of chromates by the alkaline roasting of chromite ores. The method there described comprises combining a lead salt with a solution containing a preponderance of alkali metal chromates and a minor proportion of alkali metal vanadates to co-precipitate substantially all of the vanadates together with a minor proportion of the chromates contained therein as lead chromate and lead vanadate, and the recovery of the vanadium values from the co-precipitate. The co-precipitate of lead chromate and lead vanadate obtained by this method consists essentially of substantially all of the vanadium in the process liquor as lead vanadate, a minor proportion of the chromium contained therein as lead chromate, and possibly some excess lead sulfate. The precipitate is separated from the mother liquor by filtration and the filtrate obtained is returned to the main stream of the commercial process in order to recover the remaining chromate values therein. The precipitation step results in a reduction of vanadate concentration in the process liquor to within a tolerable limit in terms of the uses to which the chromates and bichromates obtained therefrom are subsequently to be put.

As disclosed in the above-noted application, a precipitate containing the bulk of the vanadium removed from the process liquor as lead vanadate, may be treated with dilute sulfuric acid, whereby the vanadate and chromate values of the precipitate are converted to soluble acids and the lead values are converted to insoluble lead sulfate. The insoluble lead sulfate is separated from the liquor containing the soluble vanadic and chromic acids by filtration and the vanadium values contained in the filtrate are treated with an oxidizing agent in order to insure that the vanadium values in solution are at their highest state of oxidation prior to further treatment of the solution to precipitate the desired salt of hexametavanadic acid.

The need for the oxidizing agent at this point in the process arises from the fact that the use of sulfuric acid in concentrations above about 45% and at the temperatures normally employed in this and other commercial vanadium leaching processes, results in the chemical reduction of some of the vanadates contained in the acid leach solution to an extent that subsequent precipitation of the vanadium as a di-sodium or di-ammonium salt of hexametavanadic acid is ineffective to recover the vanadium values contained in the solution in any but commercially uneconomical amounts.

The present invention is directed broadly to an efficient method for the recovery of vanadium from substances containing lead vanadate by leaching such substances with dilute sulfuric acid without the necessity of resorting to an oxidizing agent to insure that the vanadium values contained in the solution are in their highest state of oxidation. Moreover, the present invention represents an improvement in the method described in application Ser. No. 59,935 (Patent No. 2,583,591), referred to hereinabove, in that it is primarily directed to the recovery of vanadates from the co-precipitate of lead chromate and lead vanadate obtained by that method. Thus, in the method of recovering vanadates from substances containing lead vanadate by the decomposition of such substances with sulfuric acid and recovering the vanadium values thereof as a salt of hexametavanadic acid, the present invention is directed to the improvement which consists essentially in leaching such substances with sulfuric acid of a concentration substantially within the range of 34½%–42½% by weight and at a temperature substantially within the range of 25°–70° C., separating the solution comprising vanadic acid from the lead sulfate thus formed, adjusting the pH of the solution to a point within the range of 1–3 with a base selected from the group of sodium and ammonium bases, and heating the solution to a temperature within the range of 80° C. to the boiling point of the solution to precipitate a salt of hexametavanadic acid.

The material containing lead vanadate to be treated in accordance with this invention may be in any suitable form, such as a finely divided precipitate of lead vanadate, or a finely ground mineral, such as ground vanadinite, in order to promote intimate contact of the leaching sulfuric acid with the vanadate containing material. For convenience the method will be described in conjunction with the co-precipitate of lead vanadate-lead chromate obtained by the method of application Ser. No. 59,935 (Patent No. 2,583,591), referred to hereinabove.

Finely divided material containing lead vanadate precipitate, lead chromate, and optionally other impurities is slurried with a dilute sulfuric acid having a concentration substantially within the range of 35½%–42½% by weight, which is equivalent to the dilution of one volume of commercial 95% sulfuric acid with 2½–3½ volumes of water. Ideally, the sulfuric acid used to leach the lead vanadate containing material has a concentration of the order of 38%, which is equivalent to the dilution of one volume of commercial 95% sulfuric acid with three volumes of water. In order to obtain the maximum ultimate yield of vanadate as a salt of hexametavanadic acid, it is preferable to avoid concentrations of sulfuric acid above about 43% by weight since such concentrations of acid may affect the chemical reduction of the leach vanadic acid as noted hereinabove, whereby the ultimate yield of vanadate precipitate is materially lessened.

In addition to the concentration of the sulfuric acid used to leach the precipitate, the temperature at which leaching is carried out is important. There is basis for a hypothesis that leaching at temperatures above about 70° C. allows coagulation of a salt of hexametavanadic acid which remains behind with the lead sulfate precipitate also obtained during the leaching step. The slurry of the dilute sulfuric acid and lead vanadate containing material is agitated for a period from 5 to 15 minutes, preferably about 10 minutes, and at a temperature substantially within the range of 25–70° C., the lower temperatures within this range corresponding to the longer contact time within the intervals given and the higher temperature range corresponding to the shorter contact time within these intervals. After the digestion of the lead vanadate containing material in the sulfuric acid for the time and at the temperatures prescribed above, the mixture is filtered in order to separate the solution from the precipitate of lead sulfate thus obtained. It has been found that filter media, such as fritted glass, ceramic filters, filter cloth made of synthetic resinous polymers, such as vinyl chloride-acrylonitrile, polyethylene, vinylidene chloride, and a commercial filter cloth known in the trade as "Vinyon N #702," comprising vinyl chloride-vinyl acetate co-polymer, are suitable in the present process.

After filtration of the supernatant liquid from the reaction mass, the precipitate is washed on the filter with water, preferably water substantially completely free of iron, since ferric ions present in the filtrate a this point in the method of the present invention result in the precipitation of iron vanadate, which will adversely affect the recovery of the vanadate values contained in the solution ultimately as a salt of hexametavanadic acid.

If the vanadate containing filtrate at this point in the process contains substantially less than 18–20 gms. of vanadate calculated as $NaVO_3$ per liter of solution, the vanadate concentration is adjusted to approximately this minimum by concentrating the solution, adding sodium vanadate thereto, or by diluting the solution if necessary to a concentration somewhere near, but not below, this minimum concentration. The solution is then heated to a temperature within the range of approximately 80° C. to the boiling point of the solution and the pH of the solution adjusted to a point within the range of 1–3, preferably, however, within the range of 2–2.5, by means of a base of the class of sodium and ammonium bases, such as sodium hydroxide, sodium carbonate, sodium bicarbonate, ammonium hydroxide, and the like. Where the improved method of the present invention is to be used in connection with a commercial alkali roast system for the recovery of chromates from chromite ores, it is advantageous both to the recovery of vanadium and the purification of the chromate liquors with respect to vanadium, to employ the excess alkali contained in the alkaline leach liquors from the leaching of the alkaline roast mass to adjust the pH of the vanadic acid solution to the desired point.

After adjusting the pH, the solution containing the vanadate values leached from the lead vanadate containing substance is agitated and heated for a period of approximately 3 hours, during which the vanadate values are precipitated from the solution as a di-sodium or di-ammonium salt of hexametavanadic acid. The precipitate is separated from the mother liquor by simple filtration, washed several times on the filter in order to remove the grossly held mother liquor, and subsequently treated by known methods in order to recover the vanadium values thereof as substantially pure vanadium pentoxide ($V_2O_5$).

It has also been found that where the improved method of the present invention is used in connection with a commercial chromate recovery process employing the alkaline roasting of a chromite ore and the subsequent leaching of the alkali roast, a cyclic method for the recovery of both the chromate values and the vanadate values of the chromite ore may be effected, which includes adjusting the pH of the sulfuric acid leach liquors from the leaching of the co-precipitate of lead chromate-lead vanadate, as noted hereinabove, with the alkaline leach liquor from the leaching of the alkali roast material, and recycling the filtrate from the separation of the salt of hexametavanadic acid ultimately obtained to the main stream of the chromate recovery of such process.

When the present invention is thus integrated with such a chromate recovery process, it has been found that there is, over an extended period of time, a very gradual increase in the vanadium content of the co-precipitate of lead chromate-lead vanadate, and that it is preferable therefore in so integrating the method of the present invention periodically to leach the lead sulfate filter cake with additional amounts of dilute sulfuric acid (1 volume of commercial 95% sulfuric acid diluted with 2.5–3.5 volumes of water) and to return the leach liquor thus obtained to a point in the commercial chromate recovery process upstream from the point where lead sulfate is added to the chromate liquors to co-precipitate lead chromate and lead vanadate. However, when thus employing the method of the present invention, there is no increase in the vanadate concentration of the chromate liquors subsequent to the point of treating such liquors with lead sulfate in order to remove the vanadate therefrom, and thus a substantially constant but very low vanadium concentration is maintained in the chromate liquors, whereby the chromate and bichromate salts obtained in the chromate recovery process contain a sufficiently small amount of vanadium to meet the purity specifications required by leather tanners and chromate pigment manufacturers.

In order that those skilled in the art may better understand the method of the present invention and by what manner the same may be carried into effect, the following specific examples are offered:

*Example I*

A chromite ore is subjected to an alkaline roast with soda ash at a temperature of the order of 1095° C. (2000° F.); the roast is leached with water and the pH of the alkaline leach liquor adjusted to a point within the range of approximately 8.5–9 in order to precipitate alumina hydrate therefrom. Thereafter, the neutralized liquor is filtered in order to separate the alumina precipitate therefrom and the filtrate taken for the purposes of this example is found to contain 374.4 gms. per liter of $Na_2Cr_2O_7 \cdot 2H_2O$ and 1.46 gms. $NaVO_3$ per liter. 86 liters of such liquor are slurried with a mass of basic lead sulfate ($PbSO_4 \cdot PbO$), weighing 2.99 kilograms, and combined with distilled water to form a paste at a temperature of 80° C. The mixture of chromate liquor and basic lead sulfate is agitated at a temperature within the range of 80°–90° C. for a period of approximately 10 minutes, and the precipitate of lead chromate-lead vanadate thus formed separated from the chromate containing liquor by filtration, and washed with water on the filter. Analysis of the filtrate thus obtained shows that 94% of the vanadium values originally contained in the chromate liquor have been removed by the treatment of the chromate liquor with the basic lead sulfate. The filter cake weighs 4.5 kilograms and contains in toto 117.5 gms. of vanadate calculated as $NaVO_3$.

A portion of this precipitate containing 23.4 gms. of vanadate calculated as $NaVO_3$ is leached with an amount of sulfuric acid chemically equivalent to 1.2 times the equivalents of lead contained in the filter cake. The acid is used in the form of a dilute solution (48%) obtained by diluting 1 volume of commercial 95% sulfuric acid with 2 volumes of distilled water, and the mixture of dilute sulfuric acid and filter cake stirred for a period of 5–10 minutes at 95° C. The solution and precipitate are separated by filtration on a fritted glass filter and the precipitate washed twice with water. The solution is combined with 410 mls. of vanadate and chromate-containing alkaline leach liquor obtained as described in the forepart of this example, (prior to the precipitation of the alumina from the leach liquor), to adjust the pH of the acid filtrate to 2.0. The total volume of the solution at this time is 1870 mls. and the total vanadate content of the solution calculated as $NaVO_3$ is found to be 24.0 gms. (The increase in the amount of vanadate is due to the vanadate contained in the alkaline leach liquor added to adjust the pH.) The resulting liquor is heated at a temperature of 90° C. and agitated for a period of 3 hours, after which the liquor and the precipitate of the di-sodium salt of hexametavanadic acid, formed during the agitation period, are allowed to stand over-night. 53% of the vanadate calculated as $NaVO_3$ and originally contained in the co-precipitate of lead chromate-lead vanadate is thus recovered as the di-sodium salt of hexametavanadic acid.

*Example II*

A second portion of the precipitate of lead chromate-lead vanadate as obtained in Example I and containing the same amount of vanadate calculated as $NaVO_3$ is leached with a solution of sulfuric acid obtained by diluting one volume of commercial 95% sulfuric acid with 3 volumes of water (38%), and containing an amount of sulfuric acid chemically equivalent to 1.2 times the amount of lead contained in the precipitate. The mixture of sulfuric acid and precipitate is heated to a temperature of 95° C. and agitated for a period of 10 minutes, after which the precipitate formed during the reaction is separated from the mother liquor by filtration through a fritted glass filter, washed with 250 mls. of water, then 150 mls. of water, to give a filtrate having a total volume of 1040 mls. Analysis of the filtrate shows that the vanadate content calculated as $NaVO_3$ is 21.1 gms. (90% of that contained in the portion of the co-precipitate prior to leaching). The filtrate is divided into two equal portions. The first portion is combined with 8.84 gms. of lead peroxide and the mixture heated to 95° C. with agitation for a period of 5 minutes. Thereafter, the mixture is filtered, washed with water, the pH of the filtrate adjusted to 2 (with 190 mls. of chromate and vanadate-containing alkaline leach liquor as described in the forepart of Example I), and the filtrate agitated for a period of 3 hours at 90° C., at the end of which time 94.8% of the vanadium (corrected for the vanadium content of the leach liquor) contained in the filtrate from the leaching of the chromate-lead vanadate cake is recovered.

The second portion of the above filtrate is treated with 190 mls. of the leached liquor as described in the forepart of Example I (prior to the removal of alumina therefrom) and agitated for a period of 3 hours at 90° C., at the end of which period the di-sodium salt of hexametavanadic acid which precipitates from the solution represents 85.4% of the vanadate calculated as $NaVO_3$ present in the solution.

*Example III*

A further portion of the lead chromate-lead vanadate cake as obtained in Example I is treated with 492 mls. of 38% sulfuric acid and the mixture thus obtained heated to 70° C. and agitated for a period of 10 minutes, after which the mixture is filtered and the filter cake thus obtained washed with two 150 mls. portions of water, the filtrate and washings being combined and diluted to give a total volume of the filtrate of 1240 mls. Analysis of this filtrate shows that 100% of the vanadate content of the lead chromate-lead vanadate cake has been leached out by this treatment. The pH of the filtrate is adjusted to 2 with aqueous sodium hydroxide, the solution heated to 90° C. and agitated for a period of 3 hours, after which the precipitate is allowed to settle and is separated from the supernatant liquid by filtration, washed with water, and dried. The dried precipitate showed that 86.2% of the vanadium values leached from the co-precipitate of lead chromate-lead vanadate are recovered as the di-sodium salt of hexametavanadic acid.

*Example IV*

25 liters of a chromate and vanadate-containing liquor obtained as in Example I are placed in a 100-liter tank and heated to a temperature of 80° C. 870 gms. of basic lead sulfate ($PbSO_4 \cdot PbO$) are slurried with water and added to the chromate liquor with agitation. The precipitate of lead chromate-lead vanadate thus obtained is separated from the solution by filtration and the filter cake washed with water to obtain a filtrate volume of 31 liters, containing 3.2 gms. of vanadate calculated as $NaVO_3$. This represents a removal of approximately 91.5% of vanadate contained in the original solution. The filter cake is found to weigh 1370 gms. when wet and is divided into equal parts containing 8.26 gms. of vanadate calculated as $NaVO_3$.

One portion of the filter cake containing 8.26 gms. of vanadate calculated as $NaVO_3$ is leached with 190 mls. of a dilute sulfuric acid solution obtained by diluting one volume of commercial 95% sulfuric acid with 3 volumes of water, the amount of sulfuric acid contained therein being equivalent to 1.2 times that required to react with the lead in the filter cake. The dilute sulfuric acid solution and filter cake are agitated at room temperature for a period of approximately 10 minutes, filtered, washed with 180 mls. of water, giving a total filtrate of 420 mls. The filtrate is analyzed for vanadate and it is found that 100% of the vanadate values originally contained in the filter cake have been leached by the above process. Thereafter, the pH in the filtrate solution is adjusted to 2 with aqueous sodium hydroxide, heated to 90° C. and agitated for a period of 3 hours. The precipitate formed during the heating and agitation is separated from the solution by filtration, washed, and it is found that 85% of the vanadate values leached from the precipitate cake is recovered as a di-sodium salt of hexametavanadic acid.

Example V

Another portion of the co-precipitate cake obtained in Example IV and containing the same amount of vanadate calculated as $NaVO_3$ is leached with 180 mls. of dilute sufuric acid obtained by diluting one volume of commercial 95% sulfuric acid with 3 volumes of water and at a temperature of 60° C. The mixture of sulfuric acid and co-precipitate cake is agitated for a period of 10 minutes; the mixture is subjected to filtration through commercial "Vinyon N #702" filter cloth, and the filter cake washed with 180 mls. of water. Analysis of the filtrate shows that 95% of the vanadate contained in the co-precipitate cake has been leached out during the above process. The pH of the filtrate is adjusted to 2 with aqueous sodium hydroxide, agitated for a period of 3 hours at 90° C. to coagulate the di-sodium salt of hexametavanadic acid, after which the precipitate is separated from the mother liquor by filtration, washed, dried, and weighed. The weight of the precipitate shows that 95.2% of the vanadate values contained in the filtrate from the leaching of the co-precipitate cake is recovered as the di-sodium salt of hexametavanadic acid.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the method of recovering vanadates from a precipitate containing lead vanadate by decomposing said precipitate with sulfuric acid and recovering the vanadium values of such precipitate as a salt of hexametavanadic acid, the improvement which consists essentially in leaching said precipitate with sulfuric acid of a concentration substantially within the range of 34.5%–42.5% and at a temperature substantially within the range of 25°–70° C., to convert said lead vanadate to vanadic acid and precipitate lead sulfate, separating the solution of vanadic acid from the lead sulfate, adjusting the pH of the solution to a point within the range of 1–3 with a base selected from the group consisting of sodium and ammonium bases, and heating the solution to a temperature within the range of 80° C. to the boiling point of the solution to precipitate a salt of hexametavanadic acid.

2. The method of claim 1 wherein said precipitate containing lead vanadate is a co-precipitate of lead chromate and lead vanadate, and wherein the amount of sulfuric acid with which said co-precipitate is leached is equivalent to 1.2 times the equivalent of lead in said co-precipitate.

3. The method of recovering alkali metal chromates and alkali metal vanadates from an aqueous solution comprising a preponderance of alkali metal vanadates, which includes adding a soluble lead compound which provides a source of lead ions in such solution to co-precipitate substantially all of the vanadates and a minor proportion of the chromates therein as their lead salts, separating the co-precipitate from the body of the solution of alkali metal chromates, leaching said co-precipitate with sulfuric acid of a concentration substantially within the range of 34.5%–42.5% and at a temperature substantially within the range of 25°–70° C., separating the solution of vanadic and chromic acids from the lead sulfate thus formed, adjusting the pH of the solution to a point within the range of 1–3 with a base selected from the group consisting of sodium and ammonium bases, heating the solution to precipitate a salt of hexametavanadic acid, and separating the precipitate from the chromic acid solution.

4. The method of claim 3 in which the lead sulfate is recycled to further quantities of alkali metal chromate solution containing alkali metal vanadates, and in which the chromic acid solution obtained in the final step is recycled to said alkali metal chromate solution upstream from the point at which said lead sulfate is recycled thereto.

5. The method of claim 4 wherein said lead sulfate is periodically leached with sulfuric acid of a concentration within the range of 34.5%–42.5% prior to the recycling of said lead sulfate to said alkali metal chromate solution, and wherein the leach liquor thus obtained is recycled to said alkali metal chromate solution upstream from the point at which said lead sulfate is recycled thereto.

6. The method of claim 4 wherein the source of the base used to adjust the pH of the vanadate containing acid leach liquor is the alkaline leach liquor obtained from the leaching of an alkaline chromite ore roast mass.

TOM S. PERRIN.
ROBERT G. BANNER.

REFERENCES CITED

The following references are of record in the file of this patent:

UNITED STATES PATENTS

| Number | Name | Date |
|---|---|---|
| 1,065,582 | Bleecker | June 24, 1913 |
| 1,784,950 | Udy | Dec. 16, 1930 |